United States Patent [19]
Edstrom et al.

[11] Patent Number: 5,337,696
[45] Date of Patent: Aug. 16, 1994

[54] ANIMAL WATERING SYSTEM AND WATERING VALVE USABLE THEREWITH

[75] Inventors: William E. Edstrom, Waterford; Edward T. Froehlich, Greenfield; George J. Grkavac, Milwaukee, all of Wis.

[73] Assignee: Edstrom Industries, Inc., Waterford, Wis.

[21] Appl. No.: 75,223

[22] Filed: May 10, 1993

[51] Int. Cl.⁵ .............................................. A01K 1/00
[52] U.S. Cl. ...................................... 119/18; 119/72.5
[58] Field of Search ................ 119/18, 72.5, 72, 15; 137/360; 251/339, 337, 364, 900; 285/308, 315

[56] References Cited

U.S. PATENT DOCUMENTS

| | | |
|---|---|---|
| 406,964 | 7/1889 | Stedman . |
| 415,273 | 11/1889 | Houston . |
| 747,111 | 12/1903 | Abrell . |
| 2,484,102 | 10/1949 | Le Valley ........................ 251/364 |
| 2,710,594 | 6/1955 | Thompson . |
| 2,939,424 | 6/1960 | Frederiksen . |
| 3,278,205 | 10/1966 | Barlow . |
| 3,386,754 | 6/1968 | Morrison . |
| 3,550,560 | 12/1970 | Edstrom . |
| 3,779,586 | 12/1973 | Rossiter . |
| 3,809,122 | 5/1974 | Berg . |
| 3,966,239 | 6/1976 | Heckenkamp . |
| 4,006,716 | 2/1977 | Cross . |
| 4,009,863 | 3/1977 | Tolnai . |
| 4,187,804 | 2/1980 | von Taschitzki . |
| 4,258,666 | 3/1981 | Edstrom . |
| 4,320,891 | 3/1982 | Cairns . |
| 4,338,884 | 7/1982 | Atchley et al. . |
| 4,370,948 | 2/1983 | Atkins . |
| 4,402,343 | 9/1983 | Thompson et al. . |
| 4,406,253 | 9/1983 | Atchley et al. . |
| 4,485,845 | 12/1984 | Brady . |
| 4,622,990 | 11/1986 | Norman . |
| 4,881,569 | 11/1989 | Fournier et al. . |
| 5,026,099 | 6/1991 | Hendrix . |
| 5,042,429 | 8/1991 | Deitrich et al. . |
| 5,065,700 | 11/1991 | Cross . |

FOREIGN PATENT DOCUMENTS 224901 4/1992 United Kingdom ................ 119/72

*Primary Examiner*—Gene Mancene
*Assistant Examiner*—Todd E. Manahan
*Attorney, Agent, or Firm*—Nilles & Nilles

[57] ABSTRACT

An animal watering system employs self-locking type quick connect couplings to couple internal watering valves in the cages serviced by the system to an external water manifold, The self-locking quick connect couplings prevent unintentional disconnection of the individual watering valves from the manifold but can be readily disconnected by operating a decoupler which may comprise a trigger or a cable, The watering valve has a deflectable elastomeric shield which is less susceptible to sticking or clogging than movable shields but which at the same time prevents or at least inhibits bedding material or other foreign materials from being jammed into the space between the valve stem and the valve housing and locking the valve in its open position, The valve also has a stem which is dimensioned to inhibit unintended valve opening, and a valve element employing a specially designed valve seat and a diaphragm which cooperate with the head of the valve stem so as to assure free flow of water through the valve even if the internal components become swollen or corroded.

20 Claims, 7 Drawing Sheets

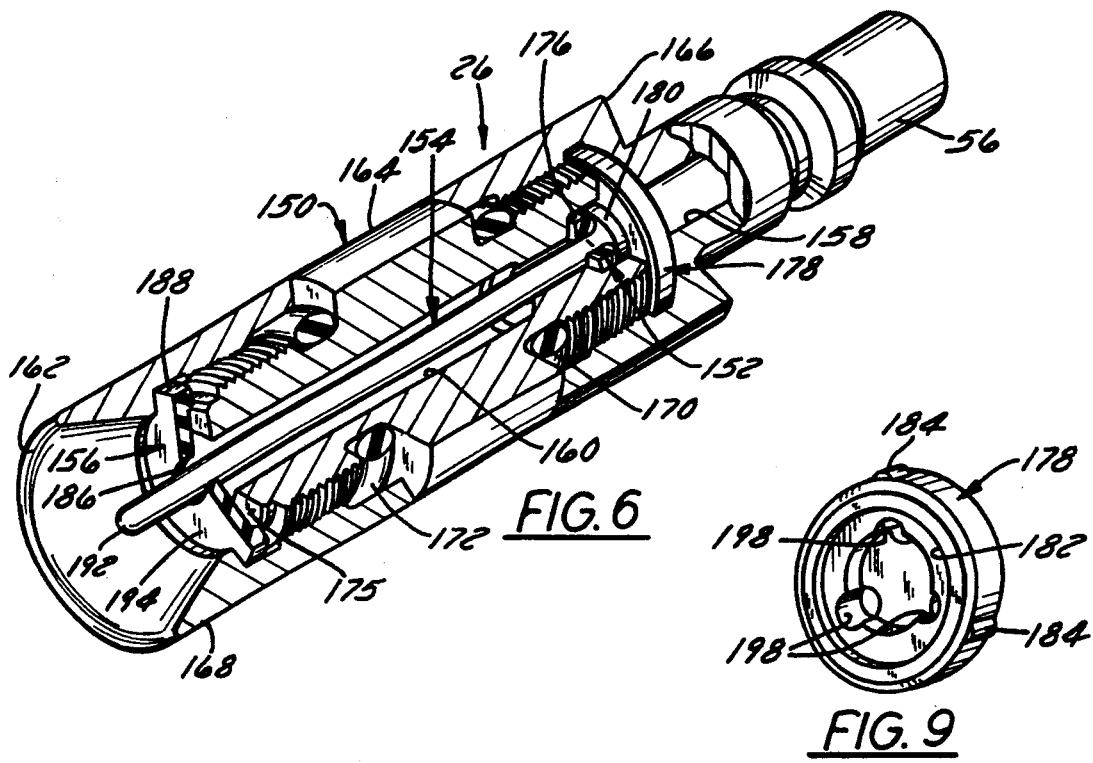
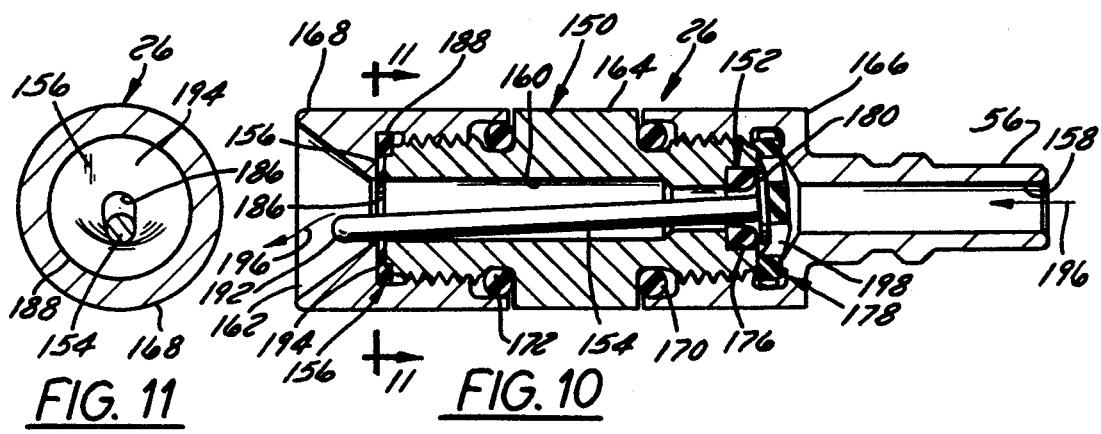
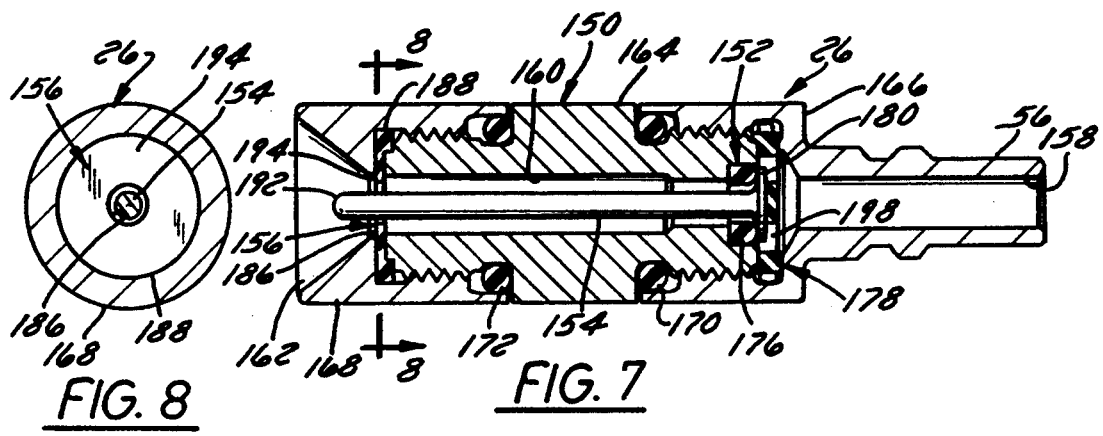

ANIMAL WATERING SYSTEM AND WATERING VALVE USABLE THEREWITH

BACKGROUND OF THE INVENTION

1. Field of the Invention

The present invention relates to watering systems and, more particularly, relates to animal watering systems for supplying drinking water to lab animals or the like and to watering valves usable with such systems.

2. Discussion of the Related Art

It is desirable in a variety of fields to reliably and automatically supply drinking water to laboratory animals or the like upon demand. Such water is typically supplied to animals housed in cages mounted on a rack system supplied with water by a water manifold. One such cage and rack system incorporating a watering system is disclosed in U.S. Pat. No. 5,042,429, which issued to Dietrich et al on Aug. 27, 1991. The system disclosed by Dietrich et al. houses a plurality of laboratory animals in rows of cages stacked one on top of the other on a rack. The cages are supplied by a common water manifold.

Watering systems of the type disclosed by Dietrich et al. typically must accommodate frequent removal of the individual cages from the rack, e.g. for testing of animals housed therein or for cleaning of cages. Such systems must also seek to minimize the cross-contamination of the animals housed in the various cages. Dietrich et al. attempts to accommodate these requirements by connecting the individual cages of its system to the manifold by a quick-connect coupling system designed to reduce the likelihood of cross-contamination. This coupling system includes, in the case of each cage, a watering valve fixed to the cage, a male fitting attached to the watering valve and extending rearwardly from the cage, and a female fitting extending from the water manifold. The male fitting engages the female fitting with a friction fit when the cage is properly positioned on the rack. According to the Dietrich et al. patent disclosure, the friction-fit type quick connect coupling facilitates removal and replacement of the cages, and the internal watering valve prevents or at least inhibits cross-contamination between cages.

The friction-fit type quick connect coupling employed by Dietrich et al., while facilitating removal and replacement of the cage, exhibits the disadvantage of not "locking" the cage in position so that if the cage is bumped or improperly positioned, the coupling may leak and/or fail to deliver water to the animal. The need has therefore arisen to provide an animal watering system which, while facilitating removal and replacement of cages and preventing or at least inhibiting cross-contamination between cages, also reliably delivers drinking water to the animals in the cages without leakage.

A watering valve of the type usable in the system disclosed by Dietrich et al. is disclosed in U.S. Pat. No. 5,065,700, which issued to Cross on Nov. 19, 1991. The valve disclosed by Cross employs a housing having an inlet and an outlet connected by an elongated longitudinal bore, a valve element located adjacent the inlet, and an elongated valve stem which extends through the bore, which projects out of the outlet, and which, when deflected by the animal, opens the valve element to permit the passage of water through the valve housing. A movable shield or shutter member is provided adjacent the outlet to inhibit the animal from stuffing bedding material or other debris into the outlet and unintentionally lodging the stem in its actuated position to cause the valve to stick in its open position.

The watering valve disclosed by Cross suffers from several drawbacks and disadvantages. For instance, its shutter or shield is rigid and thus must move with the stem or actuating lever to permit valve opening. This shield is thus subject to corrosion and jamming which may inhibit or even prevent valve opening or which may cause the valve to stick in its open position. Another disadvantage arises from the fact that the distal end of the stem is positioned outside of or at least near the outlet of the valve housing. As a result, an animal may unintentionally hold the valve open with its feet if it perches on top of the valve housing. Moreover, because neither the shield nor the valve element applies sufficient return forces to return the actuating lever or stem to its position of rest, a helical return spring must be provided to close the valve when the animal releases the valve. This spring unduly increases the complexity of the valve and is itself subject to corrosion and breakage which could render the valve inoperable. Finally, since the valve element employs conventional elastomeric seals and associated elements, it may be clogged if corroded or if chemicals in the water cause swelling or distortion of the elastomeric components of the valve element.

OBJECTS AND SUMMARY OF THE INVENTION

It is therefore an object of the invention to provide an animal watering system employing a valve and an associated coupling arrangement which can reliably and automatically supply drinking water to animals housed in cages serviced by the system while at the same time avoiding cross-contamination between cages and facilitating decoupling of the watering valves from the water source.

In accordance with a first object of the invention, this object is achieved by providing a watering system including an animal watering valve fastened to the cage and having an outlet positioned in the cage and a valve coupling for detachably connecting the valve to a source of water. The coupling includes a first fitting attached to the valve and projecting from the cage and a second fitting attached to the source of water and connectable to the first fitting. One of the first and second fittings comprises a male fitting, and the other of the first and second fittings comprises a female fitting, the female fitting having a slidable collar which locks the male fitting to the female fitting. A decoupler is provided which, when actuated, retracts the collar to unlock the male fitting from the female fitting. Preferably, the male fitting is attached to the valve and the female fitting is attached to the source of water.

The decoupler may comprise a trigger including a pivot shaft having first and second ends and a linkage connected to the first end of the shaft and to the collar. Alternatively, the decoupler may comprise a cable having a first end attached to the collar and having a grip attached thereto proximate a second end.

It is another object of the invention to provide an animal watering valve which is usable with a system of the type described above or with any other suitable system, and which cannot be easily lodged in its open position by the insertion of bedding material or other materials into the outlet of the valve.

In accordance with another aspect of the invention, this object is achieved by providing an animal watering valve comprising a housing having a longitudinal bore formed therein and having an inlet and an outlet, a valve element located in the bore, a valve stem located in the bore and extending from the valve element toward the outlet, the valve stem being laterally deflectable with respect to the housing to open the valve element, and an elastomeric shield. The shield is located in the housing and has a first portion immovably held in place between the valve element and the outlet, and a second portion which resiliently deforms upon lateral deflection of the valve stem and which has an opening receiving the valve stem.

It is another object to provide a watering valve of the type described above which cannot be accidently actuated by an animal perching on top of the valve.

In accordance with still another aspect of the invention, this object is achieved by providing a valve stem having a distal end which is recessed within the housing by a distance preventing unintentional deflection of the valve stem but providing access to the valve stem by an animal for drinking.

It is another object to provide a watering valve of the type described above which is designed to assure an even flow of water therethrough for the life of the valve by being tolerant to some swelling and/or corrosion of the internal components of the valve.

In accordance with still another aspect of the invention, this object is achieved by providing a valve having a valve element which includes a resiliently deflectable diaphragm having an aperture formed therethrough, a head of the valve stem which engages a downstream surface of the diaphragm and which forms a valve member, and an elastomeric ring which engages a downstream surface of the head and which forms a valve seat. The diaphragm, the head, and the ring coact to seal the bore when the valve stem assumes a position of rest and to permit the flow of water through the valve when the valve stem is deflected. Preferably, the ring is generally D-shaped and has a flat downstream surface and a long, cylindrical outside diameter for stability and provides a relatively large clearance between the ring and the valve stem.

Other objects, features, and advantages of the present invention will become more readily apparent to those skilled in the art from the following detailed description and the accompanying drawings. It should be understood, however, that the detailed description and specific examples, while indicating preferred embodiments of the present invention, are given by way of illustration and not of limitation. Many changes and modifications within the scope of the present invention may be made without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 6 is a perspective view of a first preferred embodiment of an animal watering valve usable in the watering system of FIG. 1;

FIG. 7 is a sectional side elevation view of the watering valve of FIG. 6, illustrating the valve in a closed position;

FIG. 8 is a sectional end view taken along the lines 8—8 in FIG. 7;

FIG. 9 is a perspective view of the diaphragm of the valve of FIGS. 6-8;

FIG. 10 is a sectional side elevation view of the watering valve of FIGS. 6-9, illustrating the valve in an open position;

FIG. 11 is a sectional end view taken along the lines 11—11 in FIG. 10;

DETAILED DESCRIPTION OF THE PREFERRED EMBODIMENTS

Resume

An animal watering system is provided employing self-locking type quick connect couplings to couple internal watering valves, disposed in the cages serviced by the system, to an external water manifold or the like. The self-locking quick connect couplings prevent unintentional disconnection of the individual watering valves from the manifold but can be readily disconnected by operating a decoupler which may comprise a trigger or a cable. The watering valve has a deflectable elastomeric shield which is less susceptible to sticking or clogging than movable shields but which at the same time prevents or at least inhibits bedding material or other foreign materials from being jammed into the space between the valve stem and the valve housing and locking the valve in its open position. The valve also has a stem which is dimensioned to inhibit unintended valve opening, and a valve element employing a specially designed valve seat and a diaphragm which cooperate with the head of the valve stem so as to assure centering of the valve stem and free flow of water through the valve even if the internal components become swollen or corroded.

System Overview

Figure 1:
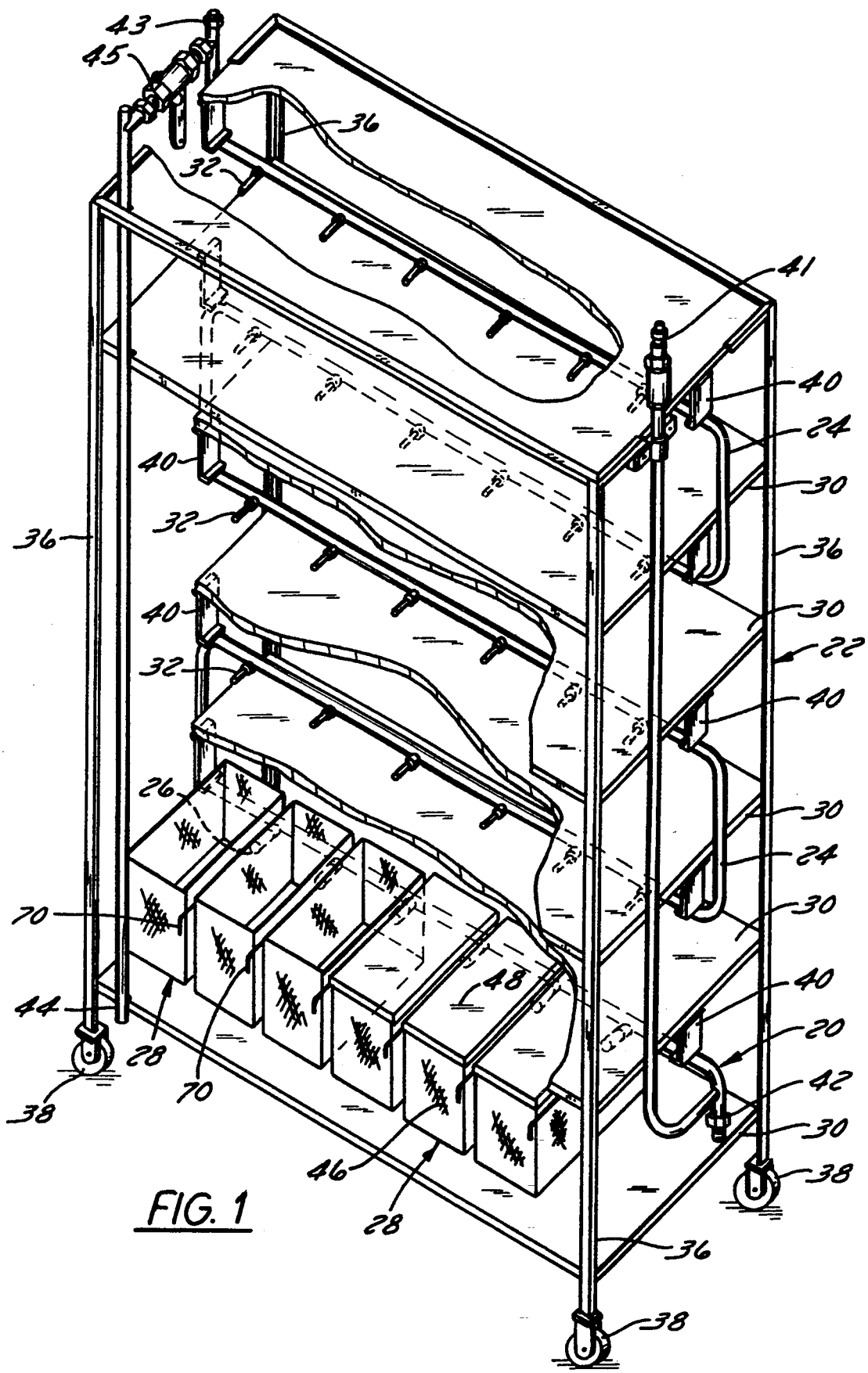
FIG. 1 is a perspective view of an animal cage and rack system incorporating a watering system constructed in accordance with a preferred embodiment of the present invention.
Figure 2:
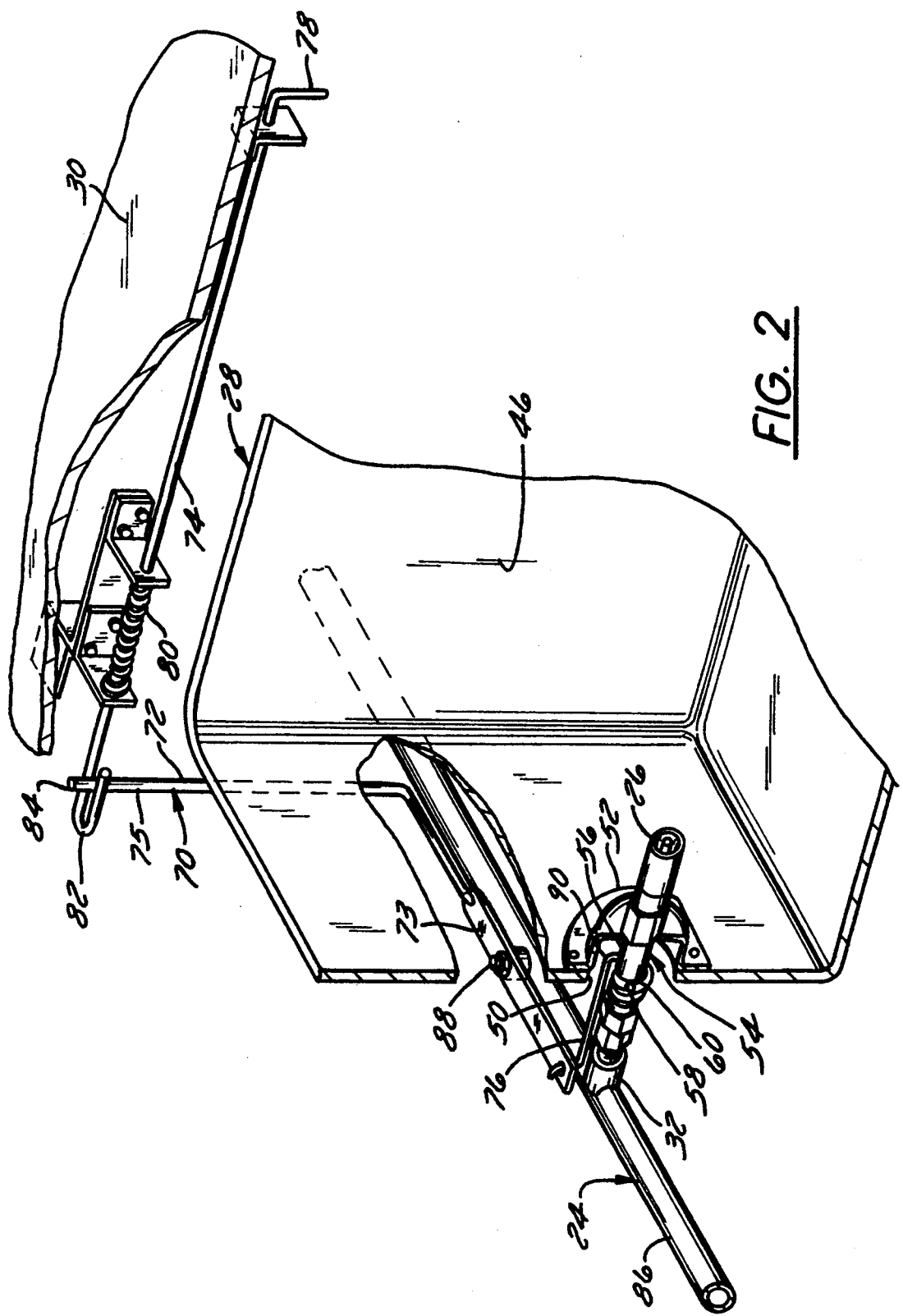
FIG. 2 is a perspective view of a portion of a cage of FIG. 1 and of the associated portion of the rack and watering systems, with the internal drinking valve of the cage being detachable from the external water manifold by a first decoupler employing a trigger mechanism.
Figure 3:
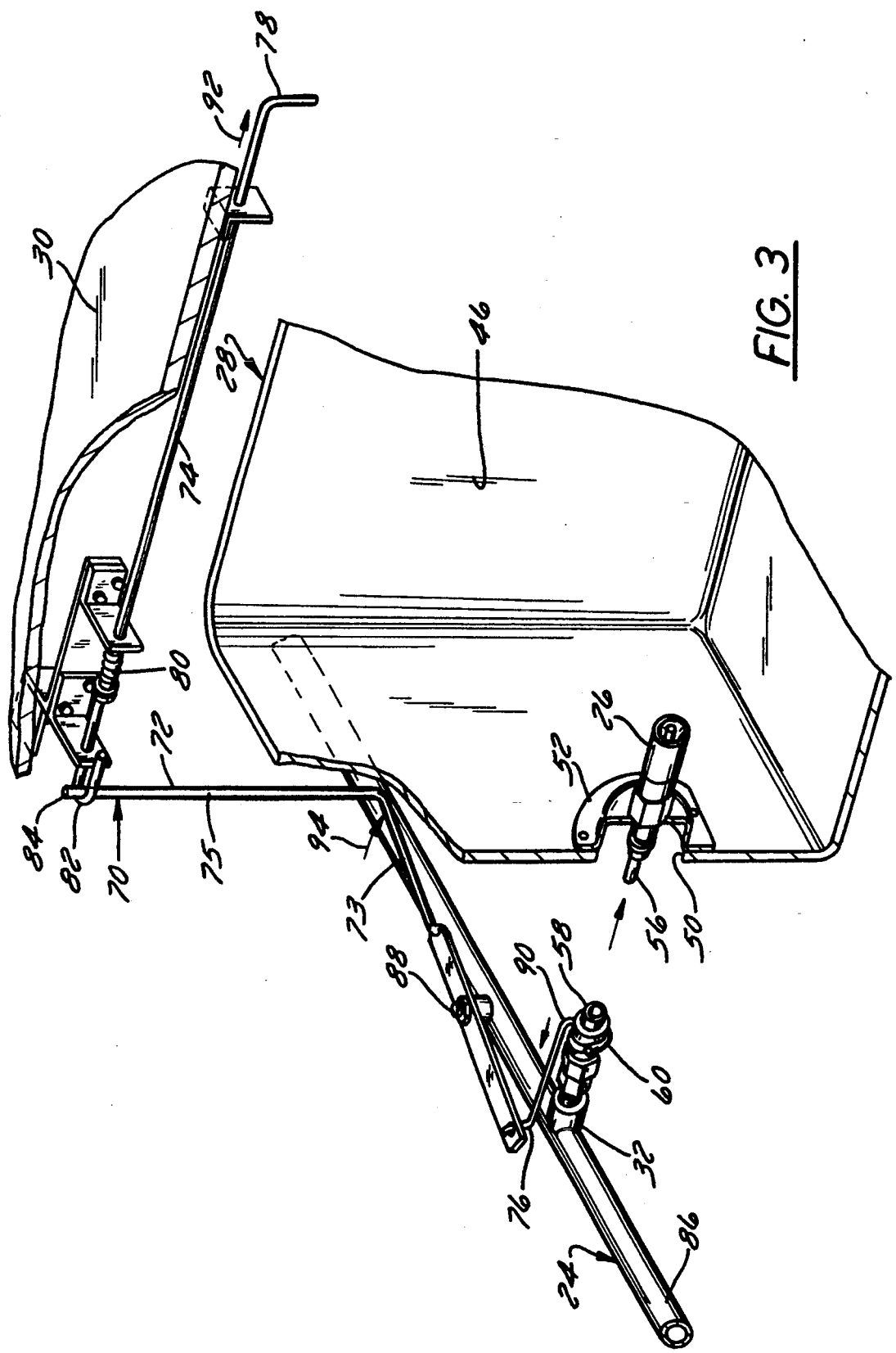
FIG. 3 is a perspective view corresponding to FIG. 2, with the internal drinking valve being uncoupled from the external water manifold.

Referring now to the drawings and to FIGS. 1-3 in particular, an animal watering system 20 is mounted on the rack 22 of a cage and rack system and includes a water manifold 24 supplying drinking water through valves 26 to animals housed in rows of cages 28 supported on shelves 30 of rack 22. The valves 26 are connected to nipples or feed lines 32, extending from the manifold 24, by locking quick-connect couplings 54 which are engaged automatically when the cages 28 are properly positioned on the shelves 30 but which must be disengaged by decouplers to permit removal of the cages.

The rack 22 is conventional with the shelves 30 being mounted one above the other on a frame 36 which is in turn supported on wheels or casters 38. The manifold 24 is connected to the shelves 30 by suitable Z-brackets 40 and, in the illustrated embodiment, is a so-called reverse "s" or reverse serpentine manifold which extends back and forth across the rack 22 along the shelves 30 from the lowermost to the uppermost shelf. The illustrated manifold 24 is positioned adjacent the back of the rack 22. Alternatively, each section of the manifold could be positioned proximate the center of the respective shelf so that cages could be positioned on either side of the manifold, thus doubling the capacity of the system at the expense of preventing placement of the rack adjacent a wall. Manifold 24 additionally includes a water inlet 41 coupled to the bottom of the manifold, a normally closed drain 42, a ball valve 45 coupled to a drain 44, and an air vent 43.

In use, the manifold 24 is filled from the bottom up, forcing air up through the manifold and out of the vent 43 thereby preventing air from being trapped in the manifold 24 which could otherwise occur with manifolds such as the one disclosed by Dietrich et al. which are filled from the top. The ball valve 45 may be used to periodically flush the manifold 24, in which case water flowing out of the valve 45 will be directed below the rack 22 by drain 44 to prevent the cages 28 from getting wet during flushing. Of course, the rack 22 and manifold 24 could be replaced with any suitable devices capable of supporting one or more cages and of supplying water to such cages.

Each of the cages 28 may also take the form of any conventional cage suitable for housing an animal and for selective removal from and replacement on the rack system 22. In the illustrated embodiment, each cage 28 includes an enclosed base 46 capped with a filter bonnet 48 having an internal filter for preventing the transfer of air from one cage to another. The base 46 of each cage 28 has an opening 50 formed therein for accommodating the valve 26 and the associated fittings. In the illustrated embodiment, this opening receives a grommet 52 having a central aperture formed therein in which is secured to the watering valve 26. Valve 26 is detachably connected to the associated nipple or feed line 32 of the manifold 24 by a quick connect coupling 54.

Coupling 54 and its use in watering systems are, per se, well known. Coupling 54 includes a male fitting 56 fixed to the valve 26 and extending rearwardly from grommet 52, and a female fitting 58 fixed to the associated nipple or feed line 32. Coupling 54 preferably comprises a so-called locking type coupling in which the male fitting 56 is sealingly locked in the female fitting 58 upon insertion therein and which requires the retraction of a collar 60 on the female fitting 58 to unlock the male fitting 58 to permit its removal. This type of coupling is preferred because it provides a more effective seal than does a friction-type coupling and cannot be accidently uncoupled by bumping the cage.

Access to the collar 60 may be limited, particularly if the backs of the cages 28 are positioned against a wall or if the cages are arranged with their backs to one another as described above. Pursuant to the invention, this problem is avoided by providing a decoupler for each coupling 54. Each decoupler is accessible from a convenient location in front of or beside the cage 28 and, when actuated, retracts the collar 60 to permit decoupling of the coupling 54 and removal of the cage.

Construction and Operation of Trigger-type Valve Decoupler

Referring now to FIGS. 2 and 3, one possible decoupler for retracting the collar 60 comprises a mechanical trigger 70. Trigger 70 comprises a pull rod 74, an L-shaped actuation lever 72 having horizontal and vertical legs 73 and 75, and an uncoupling linkage 76. Pull rod 74 is suspended from a shelf 30, runs along the side of the associated cage 28, and terminates in a handle 78 accessible by an operator from in front of or beside the cage 28. A return spring 80 may if necessary be employed to bias pull rod 74 into its deactivated position. The rear end of pull rod 74 terminates in a J-hook 82 mating with an upper end 84 of the vertical leg 75 of actuating lever 72. The horizontal leg 73 of lever 72 runs generally parallel with and is pivotally mounted via a pivot pin 88 on a horizontal supply pipe portion 86 of manifold 24. The front end of actuating lever 72 is mechanically linked to the rear end of uncoupling linkage 76, the front end of which forms a J-hook 90 or another suitable device coupled to collar 60. All components of trigger 70 are made from stainless steel or other materials resistant to rust or corrosion.

When the operator wishes to uncouple the quick connect coupling 54 to permit removal of the cage 28 from the rack system 22, he or she simply pulls the handle 78 to move the pull rod 74 forward in the direction of arrow 92 in FIG. 3, thus causing the actuating lever 72 to pivot about pivot pin 88 in the direction of arrow 94 to move the uncoupling linkage 76 rearwardly, thus retracting the collar 60 and unlocking the coupling 54. After the cage 28 is removed to decouple the male and female fittings 56 and 58, the handle 78 is released and the pull rod 74 returned to its initial position under the biasing force of return spring 80. Uncoupling linkage 76 and actuating lever 72 are returned to their respective initial positions upon reinsertion of male fitting 56 to reset the collar 60. Quick connect coupling 54 is now ready for the reconnection of the valve 26 to the manifold 24 upon replacement of the cage 28.

A simpler design (not shown) could incorporate a pull rod and lever formed integral with one another, in which case the spring 80 could be eliminated and all components returned to their initial position after actuation by reinsertion of the male fitting 56 into the female fitting 58 and resetting of the collar 60.

It may be necessary or desirable in some instances to utilize a decoupler which is more flexible or versatile than the trigger described above. In such instances, the trigger 70 could be replaced with a cable-type decoupler detailed below.

Construction and Operation of Cable-Type Decoupler

Figure 4:
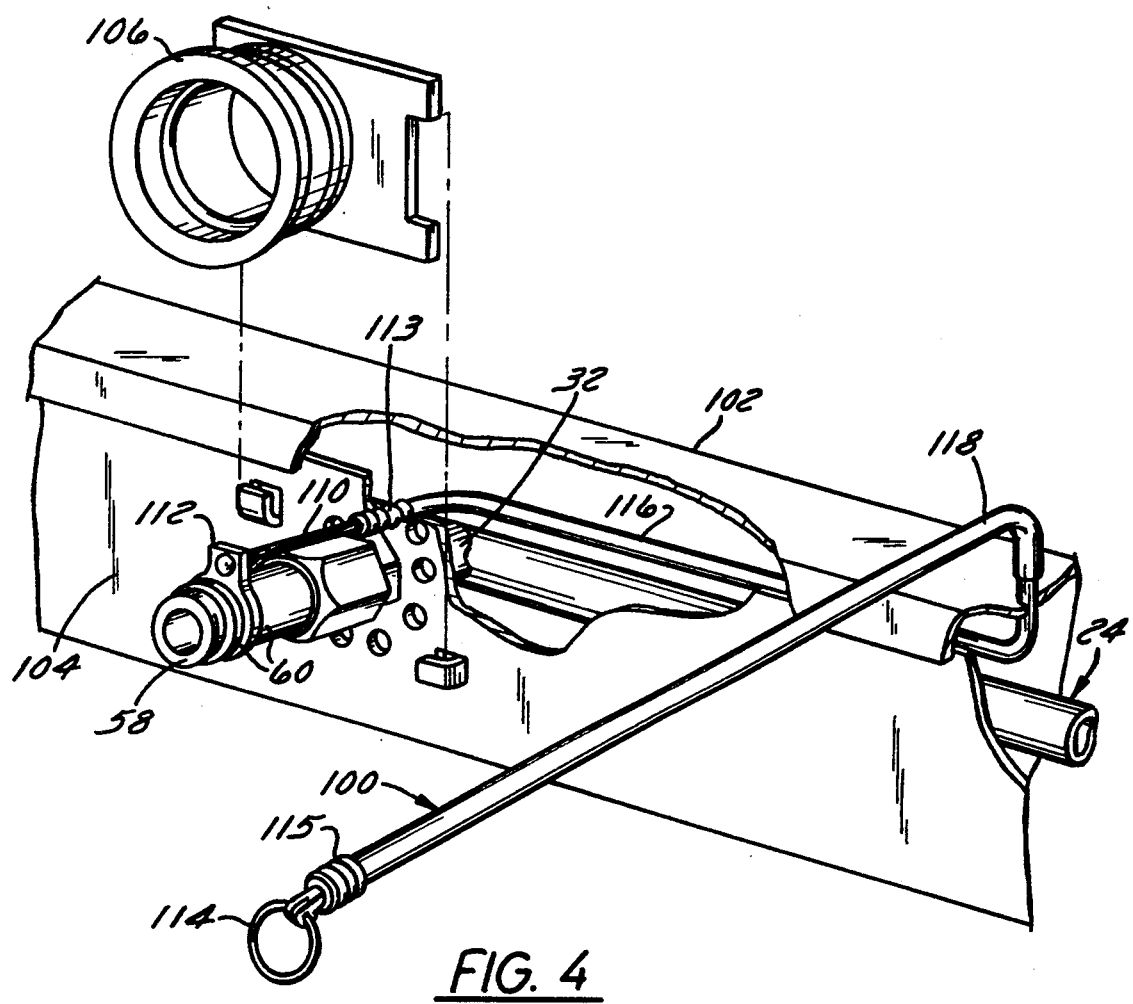
FIGS. 4 and 5 are perspective views of a portion of the cage and rack system of FIG. 1 employing alternative valve decouplers employing cables.
Figure 5:
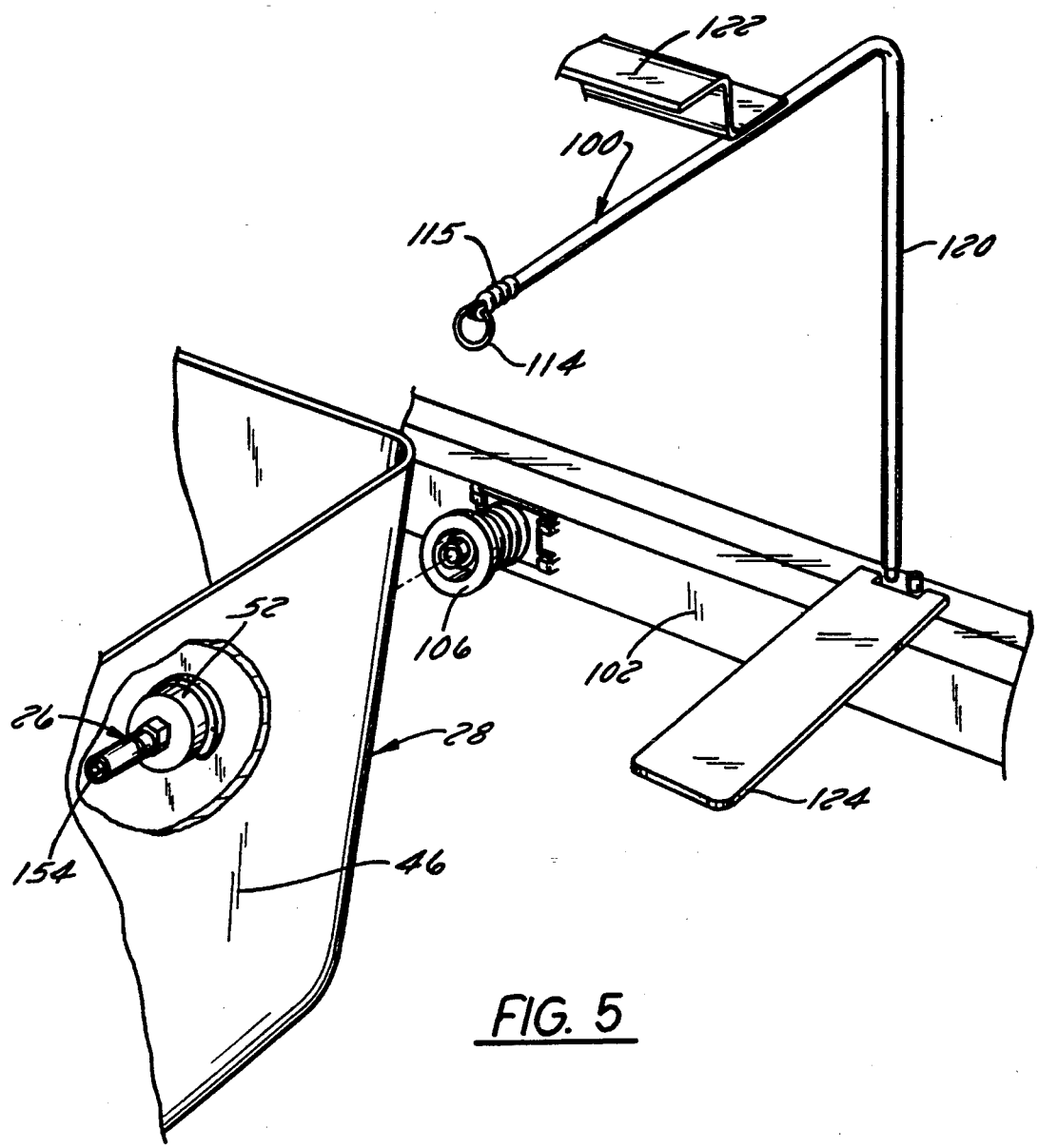

Referring now to FIG. 4, a cable-type decoupler 100 is illustrated for use with a system in which the water manifold 24 is disposed within an air plenum 102, but could be used with any manifold system. In the type of device illustrated, the feed line or nipple 32 extends through a perforated side wall 104 of the plenum 102, the perforations of which empty into a docking device 106 which is clipped to the plenum side wall 104. Docking device 106 receives the female fitting 58 of quick connect coupling 54 and extends into the grommet 52 in the base 46 of cage 28 (FIG. 5). The cable-type decoupler 100 is used with this configuration because it would be difficult or impossible to employ a trigger-type decoupler of the type described above with the plenum 102 and docking device 106.

Decoupler 100 employs a cable 110 having a leading end affixed to a tab 112 connected to collar 60 and having a trailing end connected to a pull ring 114. The cable 110 is guided through most of its length by first and second guide tubing sections 116 and 118. Section 116 is provided within plenum 102 and prevents the cable from binding or catching on plenum 102 or the water supply pipe of manifold 24. Section 118 projects beside the cage (not shown) so that the pull ring 114 is easily accessible by the operator. Cable 110 is preferably made of stainless steel or some other material which is not easily corroded, and is sealed proximate its inner and outer ends by elastomeric boots 113 and 115, respectively.

In operation, assuming that the operator wishes to decouple the quick disconnect coupling so that the cage 28 can be removed, he or she simply pulls ring 114 to retract the cable 110, thus retracting the collar 60 and permitting disconnection of the coupling 54 and removal of the cage 28. The cable 110 is returned to its initial position when the collar 60 is reset upon re-insertion of the male fitting 56 into female fitting 58.

Of course, the cable 110 need not be positioned or guided as illustrated in FIG. 4, but rather could be positioned or guided in any suitable manner for easy access by the operator. For instance, a cable-type decoupler could be used with a system such as that illustrated in FIGS. 1–3 and incorporating separate water and air manifolds, in which case the first guide tube section 116 should be clipped to the water manifold. Another possible configuration, illustrated in FIG. 5, employs an outer guide tube section 120 which replaces the guide tube section 118 of the embodiment illustrated in FIG. 4, which extends above the base 46 of cage 28, and which is soldered to or otherwise supported on a bracket 122. Bracket 122 may, if desired, be affixed to rack system 22. A docking locator 124 in the form of a cantilevered plate or similar device may also be provided to help position the base 46 of cage 28 for connection of the quick-connect coupling 54.

Each of the valves 26 preferably is designed so as to reliably provide a constant flow of drinking water to the animal housed in the cage 26 while at the same time having little susceptibility to being jammed open either by the perching of the animal on the valve or by the insertion of bedding material or other foreign matter into the outlet of the valve. The construction and operation of two especially preferred valves will now be described Construction and Operation of Watering Valves Referring now to FIGS. 1–3 and 6–11, an animal watering valve 26 exhibiting the benefits described above includes a housing 150, a valve element 152, an elongated valve stem 154, and an elastomeric shield 156. Valve 26 is operable, upon deflection of the stem 154 by an animal, to permit the flow of drinking water from an inlet 158 formed in the housing 150, through a longitudinal bore 160, and out of an outlet 162.

Housing 150 is preferably divided into three sections including a body 164 having the bore 160 formed therethrough, an inner section forming an end cap 166 having the inlet 158 formed therein, and an outer section forming a shield retainer cap 168 and having an internal recess in which is disposed the distal end 192 of stem 154. In the illustrated embodiment, end cap 166 is threadedly attached to the body 164 and sealed in place by an O-ring 170. In addition, end cap 166 may be connected to the male fitting 56 of quick connect coupling 54 or may have the male fitting formed integrally therewith as illustrated. Shield retaining cap 168 is likewise threadedly connected to the body 164, is sealed in place by an O-ring 172, and is preferably counterbored so as to be generally frusto-conical with a flat bottom forming an annular shoulder which inhibits the lodging of materials therein. The distal end 192 of valve stem 154 is preferably positioned within shield retaining cap 168 so as to be readily accessible by the animal upon demand while at the same time being sufficiently recessed within the cap 168 so that it cannot be inadvertently actuated when the animal perches on the valve. Shield 156 is clamped between the shoulder of cap 168 and the outer end of body 164.

Valve element 152 comprises a seat formed from an elastomeric ring 176, a valve member formed from the head 180 of stem 154, and a resilient valve return member formed from an elastomeric diaphragm 178. These elements coact as detailed below to reliably assure an adequate flow of water through the valve 26, even under adverse operating conditions.

Ring 176 is a D-shaped ring having a flat downstream surface and a long, cylindrical outside diameter. The clearance between the inner diameter of ring 176 and the valve stem 154 can be larger than that of a conventional circular O-ring, thus always assuring an adequate flow of water even in cases in which chemicals in the water cause swelling or corrosion of the elastomer. This D-shaped ring also provides a more stable platform for the pivoting of valve stem 154 because of its flat bottom or downstream surface and long cylindrical outer diameter. This provides another advantage over standard O-rings, which may rock if the fits between their outer diameters and inner diameter of the bores in which they are mounted are not proper.

Diaphragm 178 is held in place by being clamped between the body 164 and end cap 166 and is specially designed to be easily centered in place and to center the valve stem 154 by applying a uniform sealing force around the head 180 of the valve stem, thus permitting the use of the D-shaped ring 176. To this end, the diaphragm 178 is formed with an internal recess 182 (FIG. 9) and external centering tabs 184. The head 180 of valve stem 154 is received in the recess 182 and thus is centered on the D-shaped ring 176. The tabs 184 center the diaphragm 178 by being dimensioned to provide an interference fit between the diaphragm and the inner diameter of the valve cap 166. The desired interference fit may be provided without distorting the diaphragm by providing relatively small tabs the elastomer of which is absorbed by the larger mass of the diaphragm upon the interference fit. These tabs provide more accurate centering than may be achieved by providing an interference fit between the entire outer diameter of the diaphragm and the valve cap because the latter type of fit could cause the diaphragm to distort so as not to apply a uniform sealing force around the head 180 of the valve stem 154.

Thus, the stem head 180 defining the valve member, the ring 176 defining the valve seat, and the diaphragm 178 defining the valve return element combine to locate and position the valve stem 154 for more precise positioning and to help assure adequate water flow through the valve, even upon swelling or corrosion of some of the internal components of the valve element 152.

Shield 156 prevents or at least inhibits bedding or other materials from being lodged between the stem 154 and the inner diameter of retaining cap 168 and thus prevents the valve 26 from being inadvertently stuck open. Shield 156 is made from a pliable elastomeric material and presents a thin membrane 194 having a central aperture 186 formed therethrough for the passage of valve stem 154. This annular shield has an outer peripheral portion 188 of increased thickness which forms a shoulder which is clamped between the end 175 of the body 164 of housing 150 and the shield retaining cap 168 so that the shield 156 is securely held in position without movement of the shield relative to the remainder of the valve. Although not illustrated in the drawings, shield 156 also preferably has tabs corresponding to the tabs 184 on the diaphragm 176 which center the shield 156 in the same manner that the tabs 184 center the diaphragm 178.

The anti-clogging ability of shield 156 is enhanced by the illustrated design in which the face of the shield membrane 194 is flush with the inner surface of the shoulder of retaining cap 168, thereby preventing or at least inhibiting bedding from being lodged between the retaining cap 168 and the shield 156.

Valve 26 operates as follows. The valve normally assumes the position illustrated in FIGS. 6–8 in which the stem 154 extends generally collinear with the longitudinal centerline of the bore 160 and in which its head 180 rests flat upon and is thus sealed against the ring 176. The valve is normally held in this position by the biasing forces imposed on the head 180 by the elastomeric diaphragm 178.

When an animal wishes to obtain drinking water, it inserts its snout into the generally conical bore formed in the shield retaining cap 168 and deflects the distal end 192 of stem 154 as illustrated in FIGS. 10 and 11. If desired, deflection of the membrane 194 can be facilitated by providing three or more radial slits (not shown). This deflection causes the valve head 180 to rock about the ring 176 against the force of diaphragm 178, thus unseating the head 180 from the ring 176. This deflection also distorts the central membrane 194 of shield 156, thereby enlarging the aperture 186. Water is then free to flow in the direction of the arrows in FIG. 10 through apertures 198 formed in the diaphragm 178, between the ring 176 and the head 180 of stem 154, through the bore 160, through the now enlarged aperture 186 between the stem and the membrane 194 of shield 156, and out of the outlet 162 of the valve. When the animal releases the stem 154, it is returned to its initial position illustrated in FIGS. 7 and 8 under the biasing forces of the elastomeric diaphragm 178 and the membrane 194 of shield 156.

Figure 12:
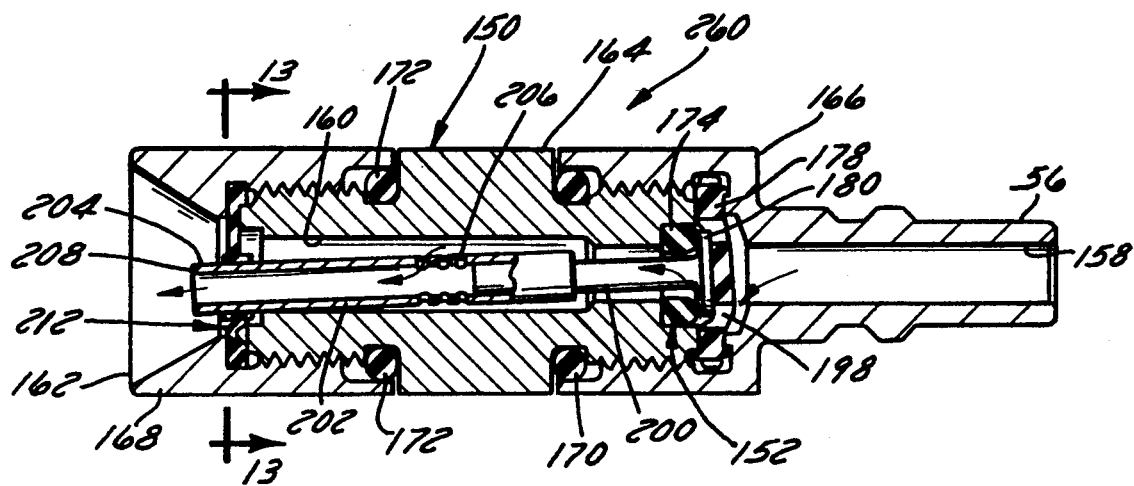
FIG. 12 is a sectional side elevation view of a second preferred embodiment of an animal watering valve usable in the watering system of FIG. 1, illustrating the valve in an open position.
Figure 13:
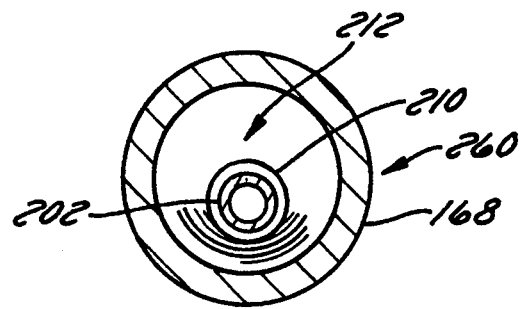
FIG. 13 is a sectional end view taken along the lines 13—13 in FIG. 12.

It may in some instances be desirable to provide a flow of water out of the valve which is more directed than that which can be provided by allowing water to flow around the periphery of the valve stem. This can be achieved by designing the valve stem such that water flows out of as opposed to around the stem. Referring now to FIG. 12 and 13, this effect can be achieved by replacing the valve stem of a valve 260 with a shortened valve stem 200 having a tube 202 press fit to the end 204 thereof. Tube 202 has radial apertures 206 formed in the inner end thereof and an outer axial aperture 208 formed in the distal end 204 thereof. The outer diameter of the distal end 204 of tube 202 is suitably sealed via an interference fit or the like to an inner lip 210 of a shield 212, the construction of which is otherwise the same as the shield 156 described above. The remainder of valve 260 is otherwise identical to valve 26 described above.

The operation of the valve 260 employing the modified stem 200, while otherwise the same as valve 26 described above, operates as follows. When an animal deflects the stem 200 to unseat the valve head 180 from the ring 176, water flows through the inlet 158 of the valve 260 and into the bore 160. Since the shield 212 distorts so as to remain sealed to the tube 202 as illustrated in FIG. 13, water can flow out of the valve 260 only through the apertures 206 formed in the tube 202, through the hollow interior of the tube, and out of the distal end 204.

Other changes and modifications which could be made to the present invention without departing from the spirit and scope thereof will become more readily apparent from a reading of the appended claims.

What is claimed is:

1. An animal watering valve comprising:
   A. a housing having a longitudinal bore formed therein and having an inlet and an outlet;
   B. a valve element located in said bore;
   C. a valve stem located in said bore and extending from said valve element toward said outlet, said valve stem being laterally deflectable with respect to said housing to open said valve element; and
   D. an elastomeric shield located in said housing and having
      (1) a first portion immovably held in place between said valve element and said outlet, and
      (2) a second portion which resiliently deforms upon lateral deflection of said valve stem and which has an opening receiving said valve stem, said shield-non-sealingly engaging said valve stem at least when said valve stem is deflected.

2. An animal watering valve as defined in claim 1, wherein said shield has tabs formed thereon for centering said shield in said bore.

3. An animal watering valve comprising:
   A. a housing having a longitudinal bore formed therein and having an inlet and an outlet;
   B. a valve element located in said bore, said a valve element comprises a generally D-shaped ring having a flat downstream surface and a long, cylindrical outside diameter;
   C. a valve stem located in said bore and engaging said D-shaped ring, said valve stem extending from said valve element toward said outlet, said valve stem being laterally deflectable with respect to said housing to open said valve element; and
   D. an elastomeric shield located in said housing and having
      (1) a first portion immovably held in place between said valve element and said outlet, and
      (2) a second portion which resiliently deforms upon lateral deflection of said valve stem and which has an opening receiving said valve stem.

4. An animal watering valve as defined in claim 3, wherein
   said diaphragm has centering tabs provided on an outer portion thereof which center said diaphragm in said bore, and
   said valve element comprises a generally D-shaped ring engaging said valve member and having a flat downstream surface and a long, cylindrical outside diameter.

5. An animal watering valve as defined in claim 3, wherein said housing has a body, an end cap located upstream of said body, and a shield retainer cap located downstream of said body, said diaphragm being located at a junction between said end cap and said body and said shield being located at a junction between said shield retainer cap and said body, said valve stem extending through said body and terminating in a distal end positioned within said shield retainer cap.

6. An animal watering system comprising:
A. a support;
B. a source of water;
C. a cage mounted on said support;
D. an animal watering valve fastened to said cage and having an outlet positioned in said cage; and
E. a valve coupling including
   (1) a first fitting attached to said valve and projecting from said cage;
   (2) a second fitting attached to said source of water and connectable to said first fitting, one of said first and second fittings comprising a male fitting, and the other of said first and second fittings comprising a female fitting, said female fitting having a slidable collar which locks said male fitting to said female fitting, and
   (3) a decoupler which, when actuated, retracts said collar to unlock said male fitting from said female fitting, wherein said decoupler comprises a trigger including
      a pivotal actuating lever having first and second ends, and
      a linkage connected to said first end of said actuating lever and to said collar.

7. An animal watering system as defined in claim 6, wherein said trigger further comprises a pull rod coupled to said second end of said actuating lever, and wherein said decoupler further comprises a spring which biases said pull rod towards a deactuated position.

8. An animal watering valve comprising:
A. a housing having a longitudinal bore formed therein and having an inlet and an outlet;
B. a valve element located in said bore;
C. a valve stem located in said bore and extending from said valve element toward said outlet, said valve stem being laterally deflectable with respect to said housing to open said valve element, wherein said valve stem terminates in a distal end recessed within said housing by a distance preventing unintentional deflection of said valve stem but providing access to said valve stem by an animal; and
D. an elastomeric shield located in said housing and having
   (3) a first portion immovably held in place between said valve element and said outlet, and
   (4) a second portion which resiliently deforms upon lateral deflection of said valve stem and which has an opening receiving said valve stem.

9. A valve comprising:
A. a housing having a bore formed therein and having an inlet and an outlet; and
B. a valve element located in said bore; wherein said valve element includes
   (1) a resiliently deflectable diaphragm having an aperture formed therethrough,
   (2) a valve member, and
   (3) a valve seat, wherein
      said diaphragm, said valve member, and said valve seat coact to seal said bore when said valve member assumes a position of rest and to permit the flow of water through said bore when said valve member is deflected,
      said valve member comprises a head of a valve stem which is located in said bore which extends from said valve element toward said outlet, said head of said valve stem being deflectable with respect to said housing to open said valve element, and
      said diaphragm has a central recess formed therein which receives said head of said valve stem, thus centering said valve stem in said bore.

10. A valve comprising:
A. a housing having a bore formed therein and having an inlet and an outlet; and
B. a valve element located in said bore; wherein said valve element includes
   (1) a resiliently deflectable diaphragm having an aperture formed therethrough,
   (2) a valve member, and
   (3) a valve seat, wherein said valve seat comprises a ring which is generally D-shaped and which has a flat downstream surface and a long, cylindrical outside diameter,
      said diaphragm, said valve member, and said valve seat coacting to seal said bore when said valve member assumes a position of rest and to permit the flow of water through said bore when said valve member is deflected.

11. An animal watering system comprising:
A. a support;
B. a source of water;
C. a cage mounted on said support;
D. an animal watering valve fastened to said cage and having an outlet positioned in said cage; and
E. a valve coupling including
   (1) a first fitting attached to said valve and projecting from said cage;
   (2) a second fitting attached to said source of water and connectable to said first fitting, one of said first and second fittings comprising a male fitting, and the other of said first and second fittings comprising a female fitting, said female fitting having a slidable collar which locks said male fitting to said female fitting, and
   (3) a decoupler which, when actuated, retracts said collar to unlock said male fitting from said female fitting, wherein said decoupler comprises a cable having a first end attached to said collar and having a grip attached thereto proximate a second end.

12. An animal watering system as defined in claim 11, further comprising a cable guide which maintains said cable in a position in which said grip is accessible by an operator.

13. A valve comprising:
A. a housing having a bore formed therein and having an inlet and an outlet; and
B. a valve element located in said bore; wherein said valve element includes
   (1) a resiliently deflectable diaphragm having an aperture formed therethrough,
   (2) a valve member, and
   (3) a valve seat;
C. a valve stem located in said bore and extending from said valve element toward said outlet; and
D. an annular elastomeric shield a portion of which is clamped in said housing between said valve element and said outlet, said shield receiving said valve stem and having a portion which resiliently deforms when said valve stem is deflected, said diaphragm, said valve stem, and said valve seat coating to seal said bore when said valve stem assumes a position of rest and to permit the flow of water through said bore when said valve stem is deflected.

14. An animal watering system comprising:
A. a support;
B. a source of water;
C. a cage mounted on said support;
D. an animal watering valve fastened to said cage and having an outlet positioned in said cage; and
E. a valve coupling including
   (1) a first fitting attached to said valve and projecting from said cage;
   (2) a second fitting attached to said source of water and connectable to said first fitting, one of said first and second fittings comprising a male fitting, and the other of said first and second fittings comprising a female fitting, said female fitting having a slidable collar which locks said male fitting to said female fitting, and
   (3) a decoupler which, when actuated, retracts said collar to unlock said male fitting from said female fitting.

15. An animal watering system as defined in claim 14, wherein said support comprises a rack capable of supporting a plurality of rows of cages, and said source of water comprises a manifold mounted on said rack.

16. An animal watering system according to claim 14, wherein said animal watering valve comprises
a housing having a longitudinal bore formed therein and having an inlet and an outlet;
a valve element located in said bore;
a valve stem located in said bore and extending from said valve element toward said outlet, said valve stem being laterally deflectable with respect to said housing to open said valve element; and
an annular elastomeric shield a portion of which is immovably clamped in said housing between said valve element and said outlet, said shield receiving said valve stem and having a portion which resiliently deforms when said valve stem is deflected.

17. An animal watering system as defined in claim 14, wherein said male fitting is attached to said valve and said female fitting is attached to said source of water.

18. An animal watering valve comprising:
A. a housing having a longitudinal bore formed therein and having an inlet and an outlet, said housing including a body and a retaining cap located proximate said outlet and connected to said body;
B. a valve element located in said bore;
C. a valve stem located in said bore and extending from said valve element toward said outlet, said valve stem being laterally deflectable with respect to said housing to open said valve element; and
D. an elastomeric shield located in said housing and having
   (1) a first portion immovably clamped between a shoulder of said retaining cap and said body, and
   (2) a second portion which resiliently deforms upon lateral deflection of said valve stem and which has an opening receiving said valve stem, said second portion being generally flush with an inner surface of said shoulder of said retaining cap.

19. An animal water valve as defined in claim 18, wherein said valve stem is tubular and has an internal passage formed therein for the flow of water.

20. An animal water valve as defined in claim 19, wherein said passage terminates in an open distal end of said valve stem, and wherein said shield is sealed to said valve stem.

* * * * *